US012719148B2

(12) United States Patent
Kaufmann et al.

(10) Patent No.: US 12,719,148 B2
(45) Date of Patent: Aug. 25, 2026

(54) GNSS ANTENNA

(71) Applicant: u-blox AG, Thalwil (CH)

(72) Inventors: Thomas Kaufmann, Zurich (CH); Seyedali Malakooti, Payneham (AU); Christophe Fumeaux, Large Bay (AU)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 18/444,253

(22) Filed: Feb. 16, 2024

(65) Prior Publication Data

US 2024/0195044 A1 Jun. 13, 2024

Related U.S. Application Data

(62) Division of application No. 17/100,086, filed on Nov. 20, 2020, now Pat. No. 11,929,541.

(51) Int. Cl.

*H01Q 1/12* (2006.01)
*H01Q 1/36* (2006.01)
*H01Q 1/48* (2006.01)
*H01Q 9/04* (2006.01)
*H01Q 5/30* (2015.01)

(52) U.S. Cl.

CPC ............. *H01Q 1/1271* (2013.01); *H01Q 1/36* (2013.01); *H01Q 1/48* (2013.01); *H01Q 9/0435* (2013.01); *H01Q 5/30* (2015.01)

(58) Field of Classification Search

CPC .......... H01Q 1/1271; H01Q 1/36; H01Q 1/48; H01Q 9/0435; H01Q 5/30; H01Q 5/28; H01Q 5/35; H01Q 9/0428; H01Q 1/38; H01Q 1/3233; H01Q 1/325; H01Q 1/50; B60J 1/20; B60J 7/00

See application file for complete search history.

(56) References Cited

U.S. PATENT DOCUMENTS 5,408,241 A 4/1995 Shattuck, Jr. et al.
6,198,457 B1 * 3/2001 Walker .................. H01Q 1/005 343/912
6,630,907 B1 10/2003 Ryken et al.
9,368,874 B2 * 6/2016 Kim ....................... H01Q 1/286
10,777,895 B2 * 9/2020 Paulotto .................. H01Q 9/40
2003/0142018 A1 7/2003 Lange (Continued)

FOREIGN PATENT DOCUMENTS

WO WO 2020/095786 A1 5/2020

OTHER PUBLICATIONS

E. D. Kaplan, Understanding GPS Principles and Applications, pp. 104-106, New York: Artech, 1996.

(Continued)

*Primary Examiner* — Dameon E Levi
*Assistant Examiner* — Jordan E. DeWitt
(74) *Attorney, Agent, or Firm* — FINNEGAN, HENDERSON, FARABOW, GARRETT & DUNNER LLP

(57) ABSTRACT

An antenna includes an optically transparent substrate layer having a first surface and an opposing second surface; a radiating element having a first mesh structure and disposed on the first surface of the substrate layer; a ground plane having a second mesh structure formed on the second surface of the substrate layer; at least two feed lines configured to connect the radiating element to an external circuit; and at least two stubs connected to the radiating element.

4 Claims, 14 Drawing Sheets

(56) References Cited

U.S. PATENT DOCUMENTS

| | | | | |
|---|---|---|---|---|
| 2004/0004571 | A1* | 1/2004 | Adachi | H01Q 9/0428 343/702 |
| 2005/0035913 | A1* | 2/2005 | Baranski | H01Q 13/16 343/713 |
| 2006/0097922 | A1 | 5/2006 | Mahmoud | |
| 2008/0256785 | A1* | 10/2008 | Deaett | H01Q 9/0407 29/601 |
| 2010/0001921 | A1* | 1/2010 | Copeland | H01Q 9/045 343/876 |
| 2010/0182210 | A1 | 7/2010 | Ryou et al. | |
| 2011/0210895 | A1* | 9/2011 | Buff, III | H01Q 1/40 343/711 |
| 2012/0287002 | A1 | 11/2012 | Parsche | |
| 2012/0306698 | A1* | 12/2012 | Warnick | H01Q 5/35 343/893 |
| 2015/0236420 | A1 | 8/2015 | Iino | |
| 2017/0324140 | A1* | 11/2017 | Talty | H01Q 1/1271 |
| 2017/0324142 | A1* | 11/2017 | Talty | H01Q 1/241 |
| 2017/0324144 | A1* | 11/2017 | Talty | H01Q 1/1271 |
| 2017/0344766 | A1* | 11/2017 | Yashiro | H01Q 7/00 |
| 2018/0080795 | A1* | 3/2018 | Roy | H04B 5/77 |
| 2019/0069788 | A1* | 3/2019 | Coleman | A61B 5/0015 |
| 2019/0165447 | A1* | 5/2019 | Furlan | H01Q 1/48 |
| 2019/0165486 | A1* | 5/2019 | Yoshida | H04B 7/0617 |
| 2020/0083615 | A1 | 3/2020 | Liu | |
| 2020/0106176 | A1 | 4/2020 | Kaufmann et al. | |
| 2021/0242553 | A1 | 8/2021 | Hiramatsu et al. | |
| 2021/0358996 | A1* | 11/2021 | Lee | H01Q 19/005 |
| 2021/0367348 | A1* | 11/2021 | Bracey | H01Q 1/288 |
| 2021/0376474 | A1 | 12/2021 | Lv et al. | |
| 2022/0166125 | A1* | 5/2022 | Kaufmann | H01Q 1/1271 |
| 2022/0255215 | A1 | 8/2022 | Park et al. | |
| 2022/0320736 | A1* | 10/2022 | Jung | H01Q 1/48 |
| 2024/0154319 | A1* | 5/2024 | Jin | H01Q 21/0006 |

OTHER PUBLICATIONS

Y. Zhang, X. Li, L. Yang and S. Gong, "Dual-Band Circularly Polarized Annular-Ring Microstrip Antenna for GNSS Applications," IEEE Antennas and Wireless Propagation Letters, vol. 12, pp. 615-618, 2013.

M. Ramirez, J. Parron, J. M. Gonzalez-Arbesu and J. Gemio, "Concentric Annular-Ring Microstrip Antenna With Circular Polarization," IEEE Antennas and Wireless Propagation Letters, vol. 10, pp. 517-519, 2011.

X. Sun, Z. Zhang and Z. Feng, "Dual-Band Circularly Polarized Stacked Annular-Ring Patch Antenna for GPS Application," IEEE Antennas and Wireless Propagation Letters, vol. 10, pp. 49-52, 2011.

Y. Guo, L. Bian and X. Q. Shi, "Broadband Circularly Polarized Annular-Ring Microstrip Antenna," IEEE Transactions on Antennas and Propagation, vol. 57, No. 8, pp. 2474-2477, Aug. 2009.

L. Li, Y. Huang, L. Zhou and F. Wang, "Triple-Band Antenna With Shorted Annular Ring for High-Precision GNSS Applications," IEEE Antennas and Wireless Propagation Letters, vol. 15, pp. 942-945, 2016.

L. I. Basilio, R. L. Chen, J. T. Williams and D. R. Jackson, "A New Planar Dual-Band GPS Antenna Designed for Reduced Susceptibility to Low-Angle Multipath," IEEE Transactions on Antennas and Propagation, vol. 55, No. 8, pp. 2358-2366, Aug. 2007.

A. S. Thampy and S. K. Dhamodharan, "Performance analysis and comparison of ITO- and FTO-based optically transparent terahertz U-shaped patch antennas," Phys. E, Low-Dimensional Syst. Nanostruct., vol. 66, pp. 52-58, Feb. 2015.

R. Xu, J. Li, J. Liu, S. Zhou and K. Wei, "Design of spiral slot-based dual-wideband dual-sense CP antenna," IET Microwaves, Antennas & Propagation, vol. 13, No. 1, pp. 76-81, 2019.

J.-Y. Jan, C.-Y. Pan, K.-Y. Chiu et al., "Broadband CPW-fed circularly-polarized slot antenna with an open slot", IEEE Trans. Antennas Propag., vol. 61, No. 3, pp. 1418-1422, Mar. 2013.

Kai-Ping Yang and Kin-Lu Wong, "Dual-band circularly-polarized square microstrip antenna," IEEE Transactions on Antennas and Propagation, vol. 49, No. 3, pp. 377-382, Mar. 2001.

Nasimuddin, Z. N. Chen and X. Qing, "Dual-Band Circularly Polarized S-Shaped Slotted Patch Antenna With a Small Frequency-Ratio," IEEE Transactions on Antennas and Propagation, vol. 58, No. 6, pp. 2112-2115, Jun. 2010.

M. Chen and C. Chen, "A Compact Dual-Band GPS Antenna Design," IEEE Antennas and Wireless Propagation Letters, vol. 12, pp. 245-248, 2013.

Q. L. Li, S. W. Cheung, D. Wu and T. I. Yuk, "Optically Transparent Dual-Band MIMO Antenna Using Micro-Metal Mesh Conductive Film for WLAN System," IEEE Antennas and Wireless Propagation Letters, vol. 16, pp. 920-923, 2017.

P. Duy Tung and C. W. Jung, "Optically Transparent Wideband Dipole and Patch External Antennas Using Metal Mesh for UHD TV Applications," IEEE Transactions on Antennas and Propagation, vol. 68, No. 3, pp. 1907-1917, Mar. 2020.

Du Plessis M et al., "Tuning Stubs for Microstrip-Patch Antennas", Antenna Designer's Notebook, IEEE Antennas and Propagation Magazine, vol. 36, No. 6, Dec. 1994. (4 pgs).

Partial European Search Report dated Apr. 8, 2022, for corresponding application No. EP 21209198. 7 (14 pgs).

* cited by examiner

GNSS ANTENNA

CROSS-REFERENCE TO RELATED APPLICATIONS

This application is a divisional of U.S. patent application Ser. No. 17/100,086, filed Nov. 20, 2020. The aforementioned application is incorporated herein by reference in its entirety.

FIELD

The present disclosure relates generally to an antenna, and more particularly, to an antenna being mounted on a vehicle.

BACKGROUND

An automotive global navigation satellite system (GNSS), especially with emerging applications for autonomous driving, requires high reliability in position estimation. A position estimation starts with reception of a satellite signal through a GNSS antenna. Thus, placement of the GNSS antenna is important for the reliability and accuracy of position estimates. For example, a GNSS antenna may provide an optimal performance at a topmost part of a vehicle than in any other positions in the vehicle. However, in a modern vehicle, for visual appearance, a GNSS antenna is usually placed in a shark-fin antenna assembly with other antennas for other systems or below the top of the front windshield. These placements provide a poor compromise in terms of technical performance.

Moreover, a high-precision GNSS positioning requires operation at two frequency bands for positioning accuracy. However, a GNSS antenna operating at two frequency bands usually has a significantly larger size than a single frequency band antenna. This larger size limits placement options for the GNSS antenna in the vehicle.

SUMMARY

According to some embodiments of the present disclosure, there is provided an antenna. The antenna includes: an optically transparent substrate layer having a first surface and an opposing second surface; a radiating element having a first mesh structure and disposed on the first surface of the substrate layer; a ground plane having a second mesh structure formed on the second surface of the substrate layer; at least two feed lines configured to connect the radiating element to an external circuit; and at least two stubs connected to the radiating element.

According to some embodiments of the present disclosure, there is also provided an antenna sticker configured as a radiating element or a ground plane of an antenna. The antenna sticker includes: a conductive mesh structure having a first surface and a second surface; and an adhesive layer formed on the second surface of the conductive mesh structure.

According to some embodiments of the present disclosure, there is further provided a glass structure for a roof or a window of a vehicle. The glass structure includes: a first conductive mesh structure formed on a first surface of the glass structure; and a second conductive mesh structure formed on a second opposing surface of the glass structure, the second conductive mesh structure being at least partially overlapped with the first conductive mesh structure.

DETAILED DESCRIPTION

Figure 1A:
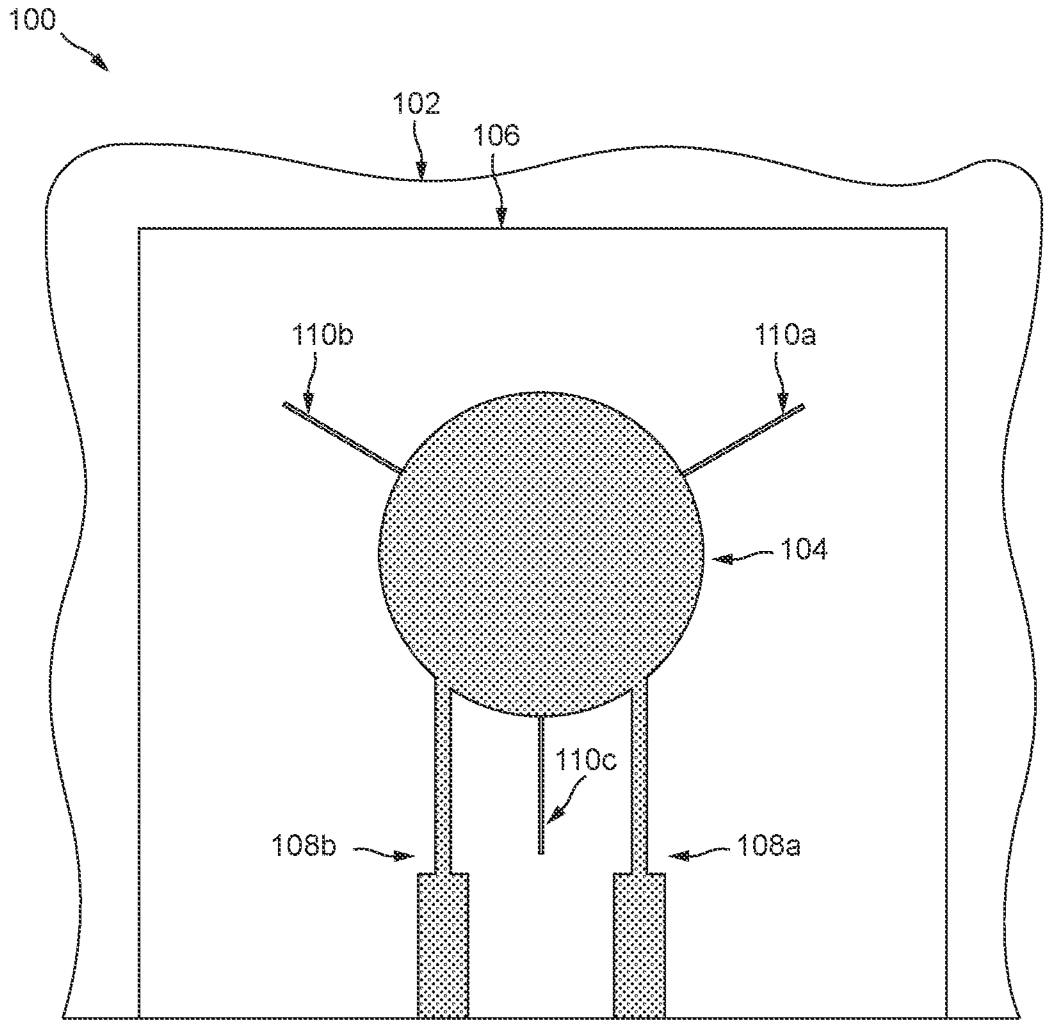
FIG. 1A is a schematic diagram illustrating a top view of an antenna.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

A GNSS receiver receives a satellite signal transmitted from a GNSS satellite constellation through a GNSS antenna and determines the position of the receiver. A high-precision GNSS position determination requires operation at two frequency bands for positioning accuracy. However, a GNSS antenna operating at two frequency bands usually has significantly larger size, especially in terms of height or antenna profile, compared to a single frequency band antenna. This prohibits placement of the GNSS antenna in an optimal position (e.g., a topmost part) of a vehicle.

In addition, for commercial applications, there are some additional manufacturing and aesthetic design considerations to take into account. An optically transparent GNSS antenna placed on a glass roof or a glass window of a vehicle, without degrading the driver or passenger's view, may provide a good solution. To this end, a material with high optical transparency needs to be used for manufacturing the antenna. However, widely used optically transparent conductors, such as Indium Tin Oxide (ITO), have relatively low conductivity for GNSS antenna implementation, leading to poor efficiency and performance degradation.

Moreover, GNSS antenna structure needs to be planar with no via holes for the glass surface (e.g., a glass roof implementation) to have higher overall transparency with lower fabrication complexity. These stringent requirements impose challenges towards developing a dual-band circularly polarized GNSS antenna with polarization purity and stable phase centers at the two operating frequency bands.

Embodiments of the present disclosure provide an antenna, an antenna sticker, and an antenna coated on a glass roof or a glass window of a vehicle. The antenna includes an optically transparent substrate layer, a radiating element disposed on a first surface of the substrate layer, a ground plane disposed on a second surface of the substrate layer, at least two feed lines configured to connect the radiating element to an external circuit, and at least two stubs connected to the radiating element. The radiating element has a mesh structure that is concentric around a circular patch and rectangular along a feeding direction. The ground plane may have a second mesh structure. Each of the at least two feed lines may include first and second rectangular portions, the first rectangular portion having a width smaller than a width of the second rectangular portion. The at least two stubs may be tilted and connected to recesses formed on the radiating element.

Embodiments disclosed herein have one or more technical effects. Using a transparent substrate ensures overall optical transparency of the antenna. By utilizing a mesh structure having a plurality of openings for the radiating element and the ground plane, light transmission through the openings is ensured, leading to enhanced overall optical transparency of the antenna. By adopting a mesh pattern that is concentric around a circular radiating element and rectangular along a feeding direction, high efficiency of the antenna is achieved. By utilizing two feed lines that are partially thinned and have a mesh structure, good impedance matching and high efficiency are obtained. Connecting a plurality of stubs to the circumference of the radiating element having recesses allows for achievement of target frequency bands by adjusting an input impedance of the stubs. The structure of antennas of the present disclosure allows for easy integration without critical alignment (e.g., a sub-millimeter scale) for feeding, compared with an aperture-coupled feed from a bottom layer. The overall optical transparency of the antennas allows for placement of the antennas at an optimum location, e.g., a top-most part of a vehicle, without impeding visual appearance. The antennas can be manufactured as additive stickers or coated onto a glass roof or a glass window of a vehicle, providing convenience and reduced cost.

Figure 1B:
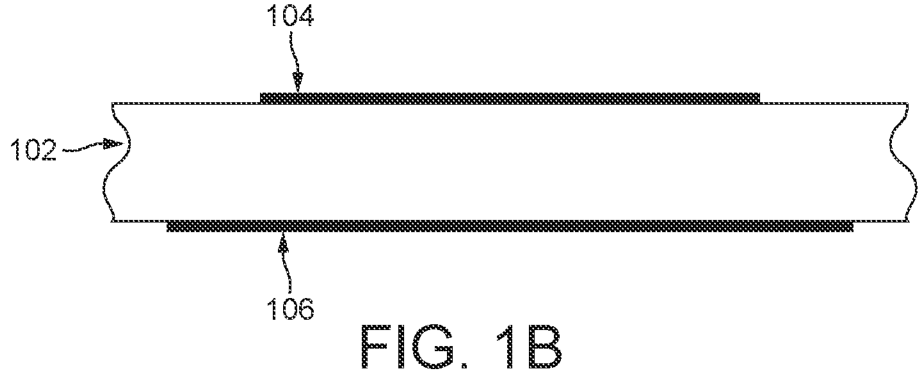
FIG. 1B is a schematic diagram illustrating a side view of the antenna, consistent with some embodiments of the present disclosure.

FIG. 1A is a schematic diagram illustrating a top view of an antenna, and FIG. 1B is a schematic diagram illustrating a side view of the antenna, consistent with some embodiments of the present disclosure. Referring to FIG. 1A and FIG. 1B, an antenna 100 includes a substrate 102, a radiating element 104 disposed on a top surface of substrate 102, and a ground plane 106 formed on a bottom surface of substrate 102. In an embodiment, substrate 102 may be made of an optically transparent material, such as a glass or a polymer. However, the selection of materials for substrate 102 is not so limited, and any low dielectric loss material having a suitable dielectric constant and optical transparency can be used as the substrate.

Radiating element 104 is a conductive layer such as a metal or metal alloy that forms a patch layer. For example, radiating element 104 may be a metal layer having a moderate conductivity. However, radiating element 104 is not so limited. Any material having a suitable conductivity can be used as radiating element 104. Radiating element 104 may be formed by thin-film deposition or plating or any other method known in the art. In an embodiment, radiating element 104 has a mesh structure that includes a plurality of openings. The plurality of openings in the mesh structure allows for transmission of ambient light, e.g., sunlight, through the openings, thereby increasing overall optical transparency of the antenna.

Referring to FIG. 1B, antenna 100 includes ground plane 106. Ground plane 106 may be a conductive layer such as a metal or a metal alloy. In an embodiment, ground plane 106 has a mesh structure. The mesh structure of ground plane 106 may be the same as or different from the mesh structure of radiating element 104.

Referring again to FIG. 1A, antenna 100 includes a feed line 108*a* and a feed line 108*b* that are connected to radiating element 104. Feed lines 108*a* and 108*b* are configured to connect radiating element 104 to an external circuit (not shown) to feed two frequency bands simultaneously. In an embodiment, feed lines 108*a* and 108*b* are substantially parallel to each other. Each of feed lines 108*a* and 108*b* includes a first rectangular portion (the top portions of feed lines 108*a* and 108*b*) connected to radiating element 104 and a second rectangular portion (the bottom portions of feed lines 108*a* and 108*b*) connected to the external circuit. The first rectangular portion may be thinned so that it has a width smaller than a width of the second rectangular portion. Thinning the portions of the feed lines connected to the radiating element allows for facilitation of matching and reduction of cross-coupling of the feed lines.

In an embodiment, each of feed lines 108*a* and 108*b* may have a mesh pattern. In an embodiment, antenna 100 may have more than two feed lines connected to radiating element 104 so that a plurality of frequency bands can be fed to the antenna.

Still referring to FIG. 1A, antenna 100 includes stubs 110*a*, 110*b*, and 110*c* that are connected to radiating element 104. As shown in FIG. 1A, radiating element 104 may have a circular shape and stubs 110*a*, 110*b*, and 110*c* can be connected to a circumference of radiating element 104. In an embodiment, stubs 110*a*, 110*b*, and 110*c* are evenly distributed along the circumference of radiating element 104 such that the angle between stub 110*a* and stub 110*b* is 120 degrees and the angle between stub 110*b* and stub 110*c* is also 120 degrees. Each of stubs 110_a_, 110_b_, and 110_c_ may or may not have a mesh pattern. As an alternative to a mesh pattern, each of stubs 110_a_, 110_b_, and 110_c_ may instead be formed as a very thin line (e.g., 0.2-0.5 mm). Using the stubs connected to the radiating element allows for achievement of high efficiency, and a good axial ratio and gain at two frequency bands.

Figure 2A:
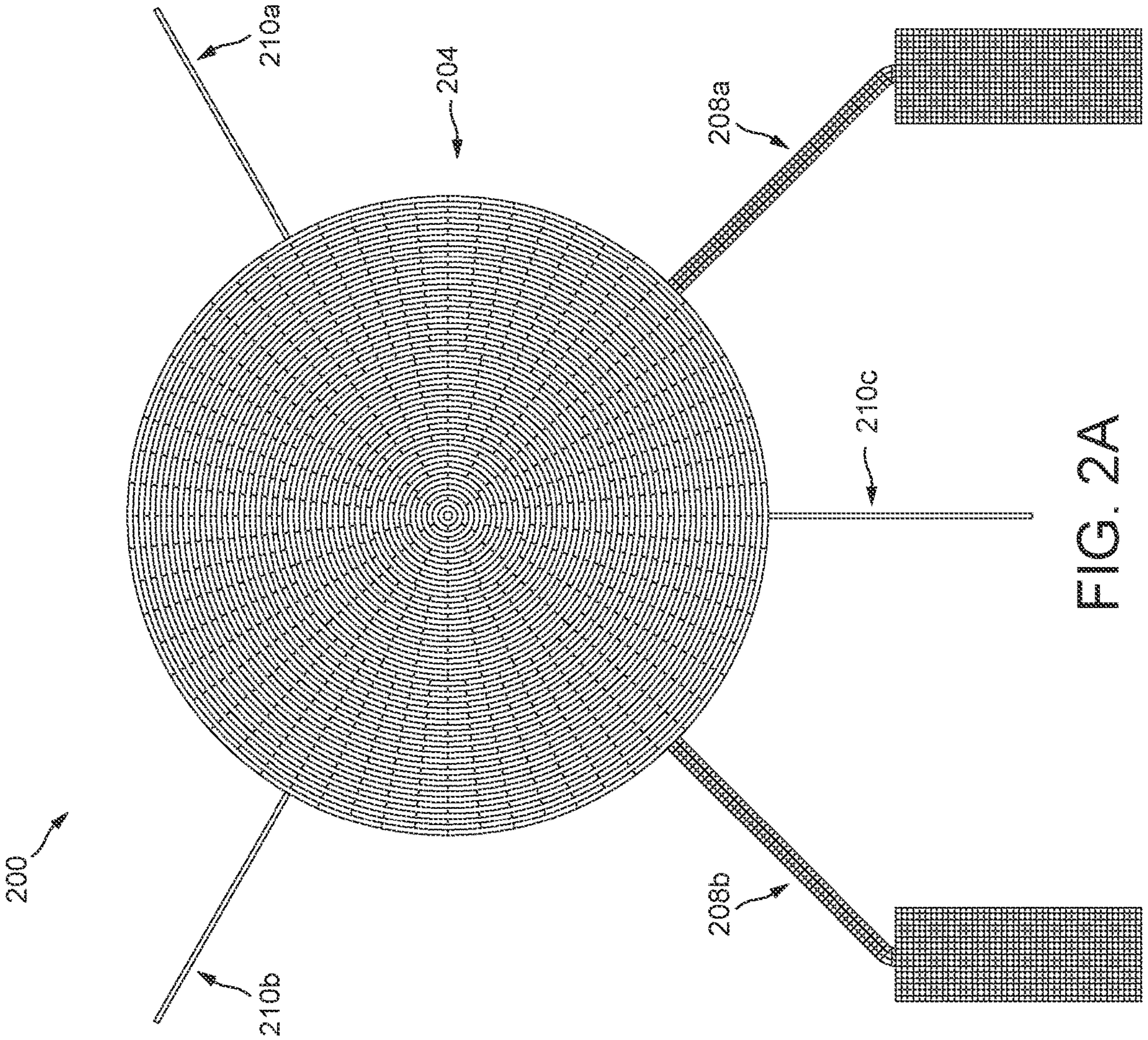
FIG. 2A is a schematic diagram illustrating an exemplary mesh structure of a top surface of an antenna.
Figure 2B:
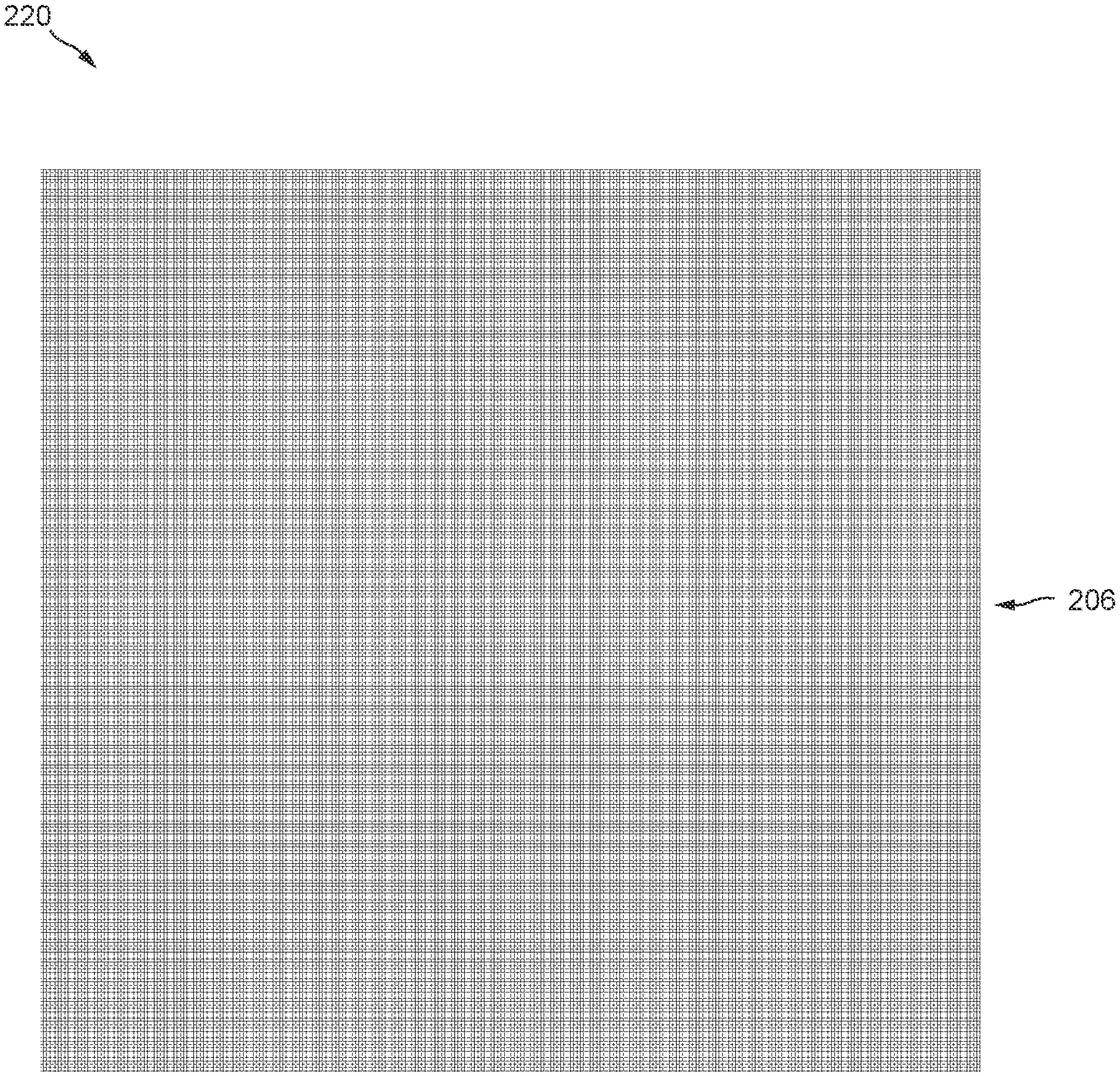
FIG. 2B is a schematic diagram illustrating an exemplary mesh structure of a bottom surface of an antenna, consistent with some embodiments of the present disclosure.

FIG. 2A is a schematic diagram illustrating an exemplary mesh structure of a top surface 200 of an antenna, and FIG. 2B is a schematic diagram illustrating an exemplary mesh structure of a bottom surface 220 of an antenna, consistent with some embodiments of the present disclosure. As shown in FIG. 2A, top surface 200 of the antenna includes a mesh structure for a radiating element 204, and mesh structures for feed lines 208_a_ and 208_b_. Compared with feed lines 108_a_ and 108_b_ of FIG. 1, each of feed lines 208_a_ and 208_b_ in FIG. 2A is bent at the joint of the thinner leg and the thicker leg. Top surface 200 of the antenna also includes stubs 210_a_, 210_b_, and 210_c_. The mesh structure for radiating element 204 has a plurality of concentrically arranged openings to form a circular mesh-patterned patch. However, the design of the mesh structure is not so limited. Any mesh pattern providing a plurality of openings and high efficiency of the antenna can be adopted for the mesh structure. Referring to FIG. 2B, bottom surface 220 of the antenna includes a mesh structure for a ground plane 206, such as ground plane 106 of FIG. 1A. As shown in FIG. 2B, ground plane 206 has a mesh structure different from the mesh structure of radiating element 204.

Using a transparent substrate ensures optical transparency of the antenna. By utilizing a mesh structure having a plurality of openings for the radiating element and the ground plane, light transmission through the openings is ensured, leading to enhanced overall optical transparency of the antenna. By adopting a mesh pattern that is concentric around a circular radiating element and rectangular along a feeding direction, high efficiency of the antenna is achieved. By utilizing two partially thinned feed lines and a plurality of stubs connected to the circumference of the radiating element, high efficiency, and a good axial ratio and a high gain of dual frequency bands are obtained. In an exemplary embodiment, the two frequency bands applied to antenna 100 are L1 (1575.4 MHz) and L5 (1176.4 MHz), and a frequency ratio L1/L5 of 1.3 is obtained.

In an embodiment, two frequency band antenna properties are simulated using antenna 100 shown in FIGS. 1A-1B. Operation of antenna 100 is simulated at the frequency bands L1 and L5. The simulation results are shown in FIGS. 3-7, described below.

Figure 3:
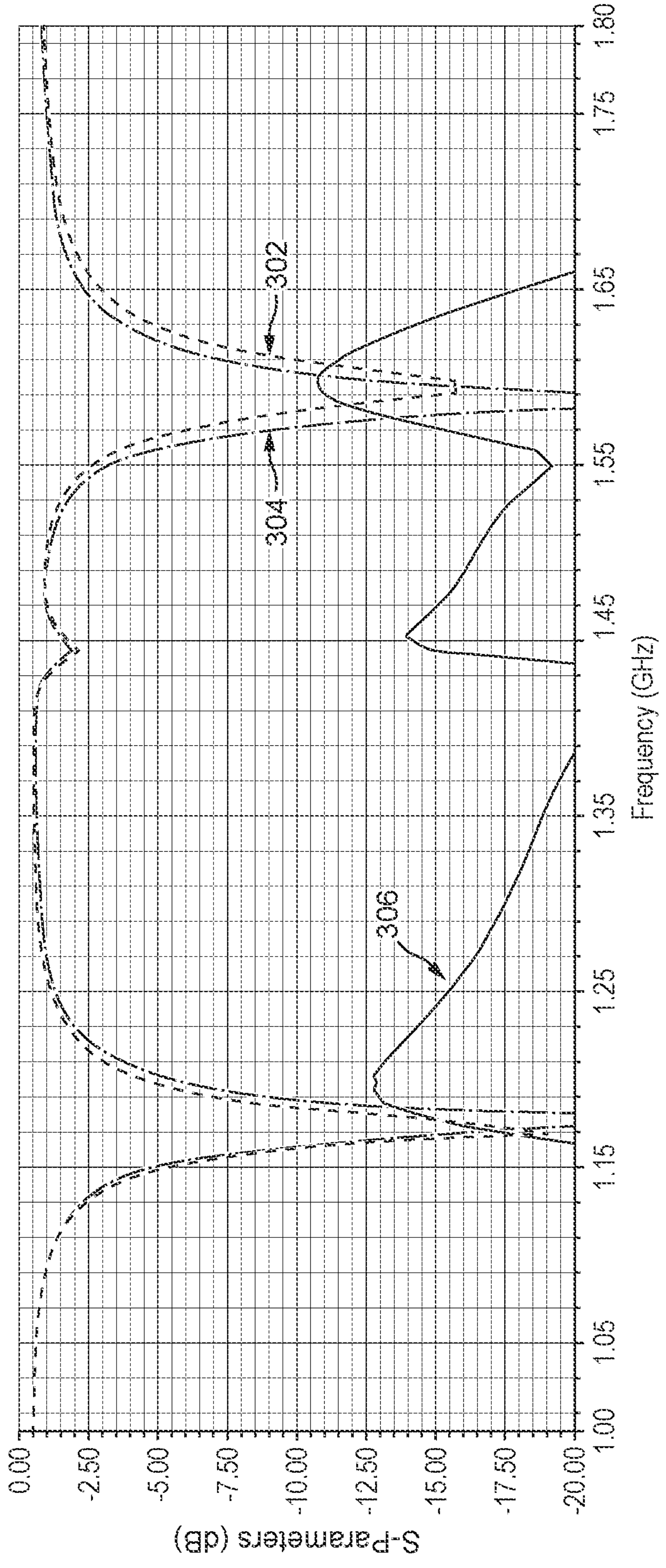
FIG. 3 is a plot illustrating a simulated reflection coefficient of an antenna as a function of frequency, consistent with some embodiments of the present disclosure.

FIG. 3 is a plot illustrating simulated reflection coefficients of antenna 100 as a function of frequency, consistent with some embodiments of the present disclosure. A reflection coefficient (or return loss) represents how much power is reflected from the antenna. For example, a zero reflection coefficient indicates that all the power is reflected from the antenna and no power is radiated. In FIG. 3, line 302 and line 304 illustrate reflection coefficients S11 and S22 at two ports (not shown) of antenna 100, respectively, and line 306 illustrates a forward gain S21. As shown in FIG. 3, reflection coefficients S11 and S22 show a peak at frequency ranges of 1550-1606 MHz and 1166-1186 MHz, indicating a good match with the L1 frequency band (1575.4 MHz) and L5 frequency band (1176.4 MHz), respectively. The forward gain S21 indicates sufficient isolation between the two ports, which ensures a good axial ratio of antenna 100.

Figure 4A:
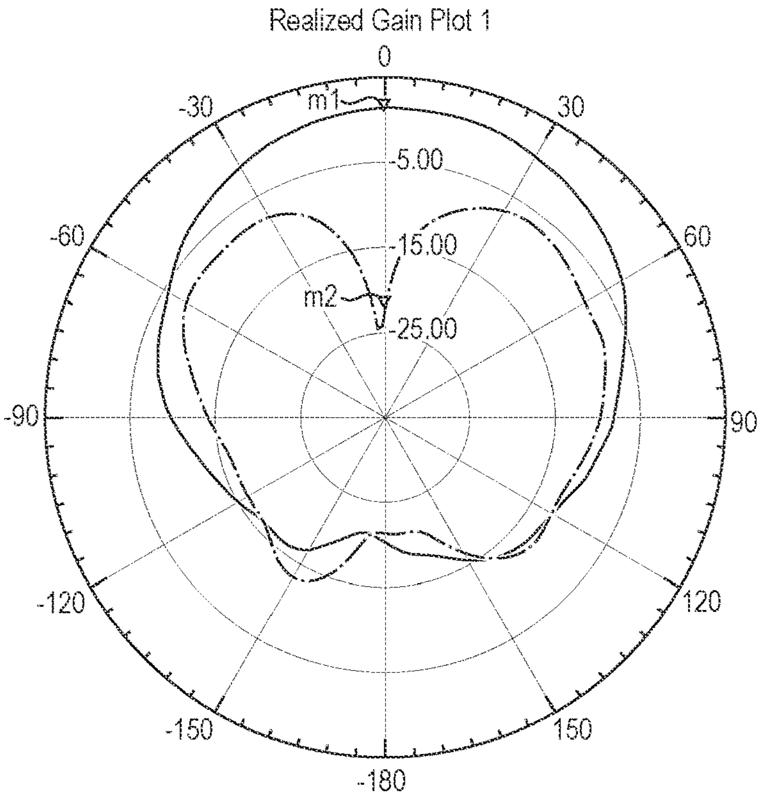
FIG. 4A is a plot illustrating a simulated realized RHCP and LHCP radiation patterns at a first L1 frequency band edge (1560 MHz)
Figure 4B:
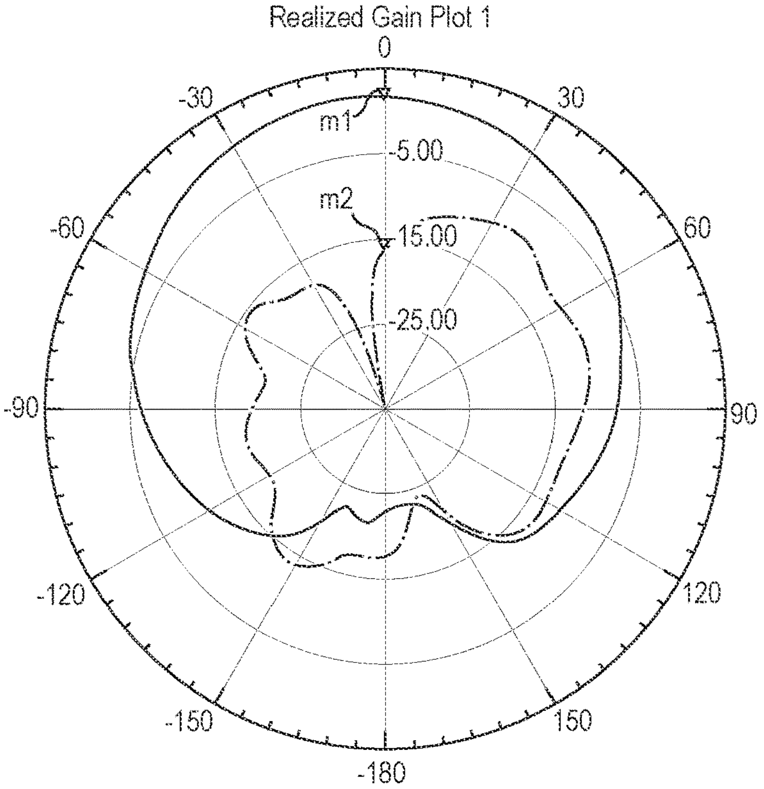
FIG. 4B is a plot illustrating a simulated realized RHCP and LHCP radiation patterns at a second L1 frequency band edge (1608 MHz), consistent with some embodiments of the present disclosure.

FIG. 4A is a plot illustrating a simulated realized right hand circularly polarized (RHCP) signal radiation pattern (marked m1), and a simulated realized left hand circularly polarized (LHCP) signal radiation pattern (marked m2), at a first L1 frequency band edge (1560 MHz), and FIG. 4B is a plot illustrating a simulated realized RHCP signal radiation pattern (marked m1), and a simulated realized LHCP signal radiation pattern (marked m2), at a second L1 frequency band edge (1608 MHz), consistent with some embodiments of the present disclosure. As shown in FIGS. 4A and 4B, radiation patterns with dominating right hand circularly polarized (RHCP) signals and a peak gain towards zenith are obtained.

Figure 5A:
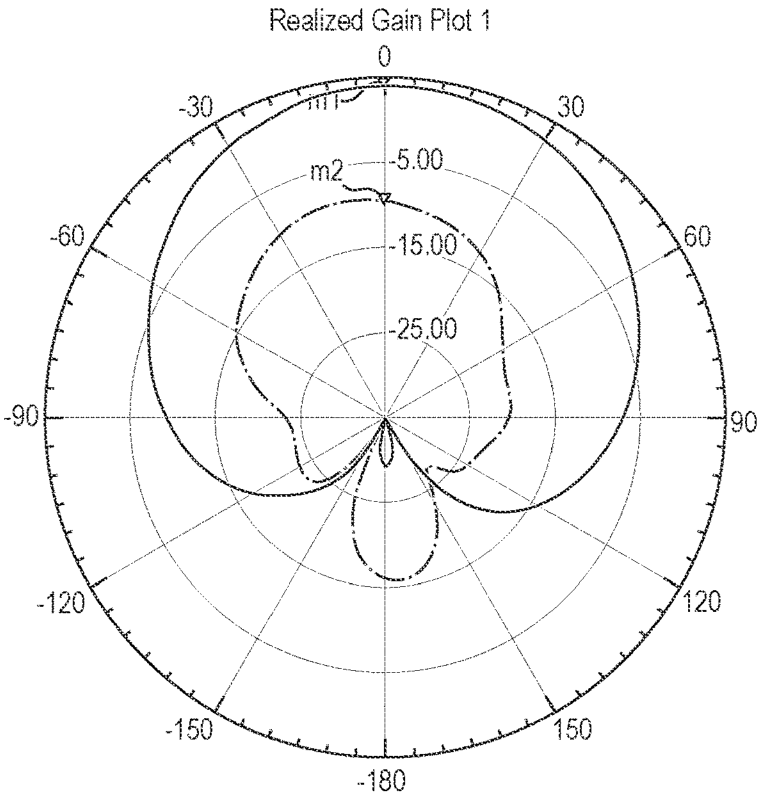
FIG. 5A is a plot illustrating a simulated realized RHCP and LHCP radiation patterns at a first L5 frequency band edge (1160 MHz)
Figure 5B:
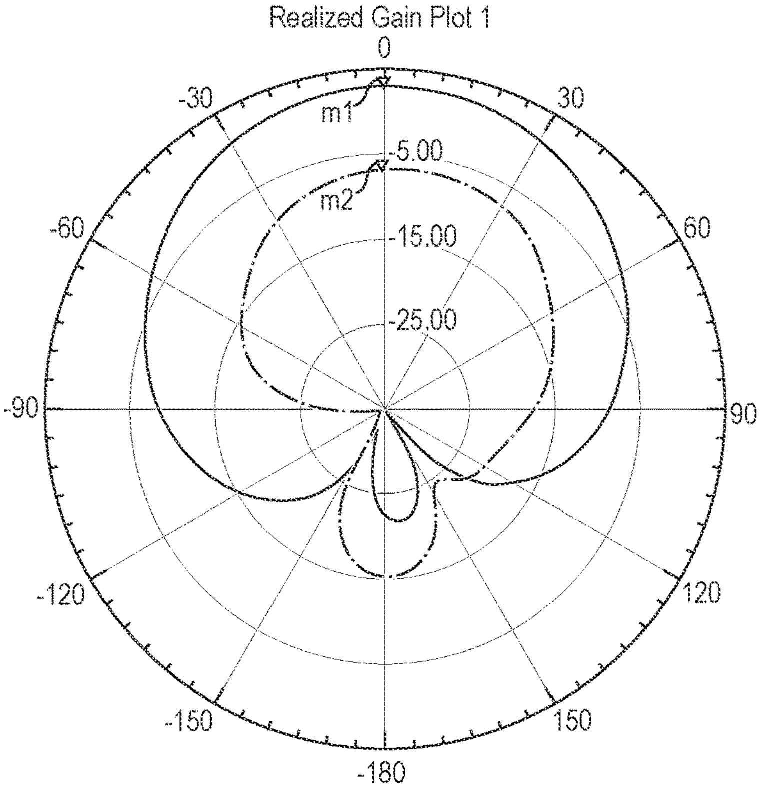
FIG. 5B is a plot illustrating a simulated realized RHCP and LHCP radiation patterns at a second L5 frequency band edge (1188 MHz), consistent with some embodiments of the present disclosure.

FIG. 5A is a plot illustrating a simulated realized RHCP signal radiation pattern (marked m1), and a simulated realized LHCP signal radiation pattern (marked m2), at a first L5 frequency band edge (1160 MHz), and FIG. 5B is a plot illustrating a simulated realized RHCP signal radiation pattern (marked m1), and a simulated realized LHCP signal radiation pattern (marked m2), at a second L5 frequency band edge (1188 MHz), consistent with some embodiments of the present disclosure. As shown in FIGS. 5A and 5B, again, radiation patterns with dominating RHCP signals and a peak gain towards zenith are obtained.

Figure 6:
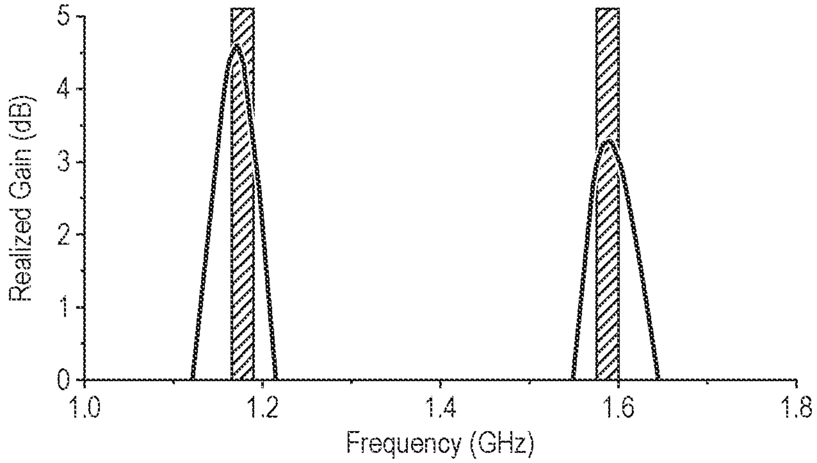
FIG. 6 is a plot illustrating a simulated realized RHCP gain towards a zenith of an antenna as a function of frequency, consistent with some embodiments of the present disclosure.

FIG. 6 is a plot illustrating a simulated realized RHCP gain towards a zenith of an antenna as a function of frequency, consistent with some embodiments of the present disclosure. The gray bar at the left side represents a frequency range of interest for the L5 frequency band and the gray bar at the right side represents a frequency range of interest for the L1 frequency band. As shown in FIG. 6, a maximum gain of 4.5 dB at L5 frequency band, and a maximum gain of 3.5 dB at L1 frequency band are obtained, which is very good given the moderate effective conductivity of the conductors used for the antenna.

Figure 7:
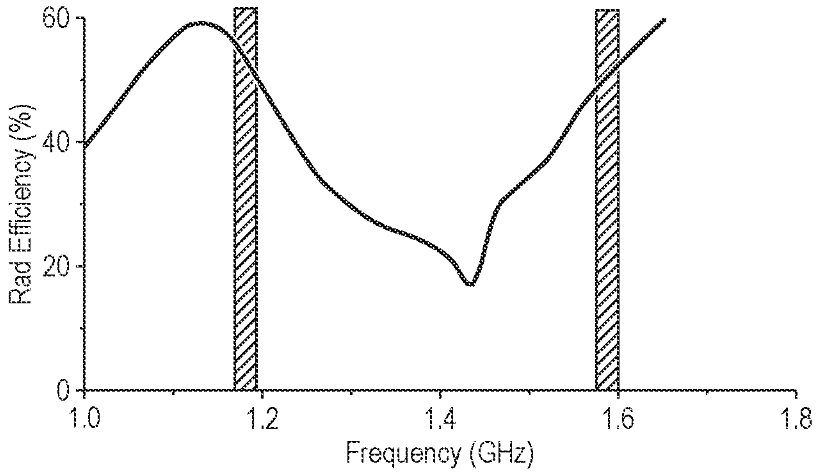
FIG. 7 is a plot illustrating a simulated antenna radiation efficiency as a function of frequency, consistent with some embodiments of the present disclosure.

FIG. 7 is a plot illustrating a simulated antenna radiation efficiency as a function of frequency, consistent with some embodiments of the present disclosure. The gray bar at the left side represents a frequency range of interest for the L5 frequency band and the gray bar at the right side represents a frequency range of interest for the L1 frequency band. As shown in FIG. 7, the simulated antenna radiation efficiency is on the order of 50% in both frequency bands, which is very good given the moderate conductivity of the conductors used for the antenna.

Figure 8:
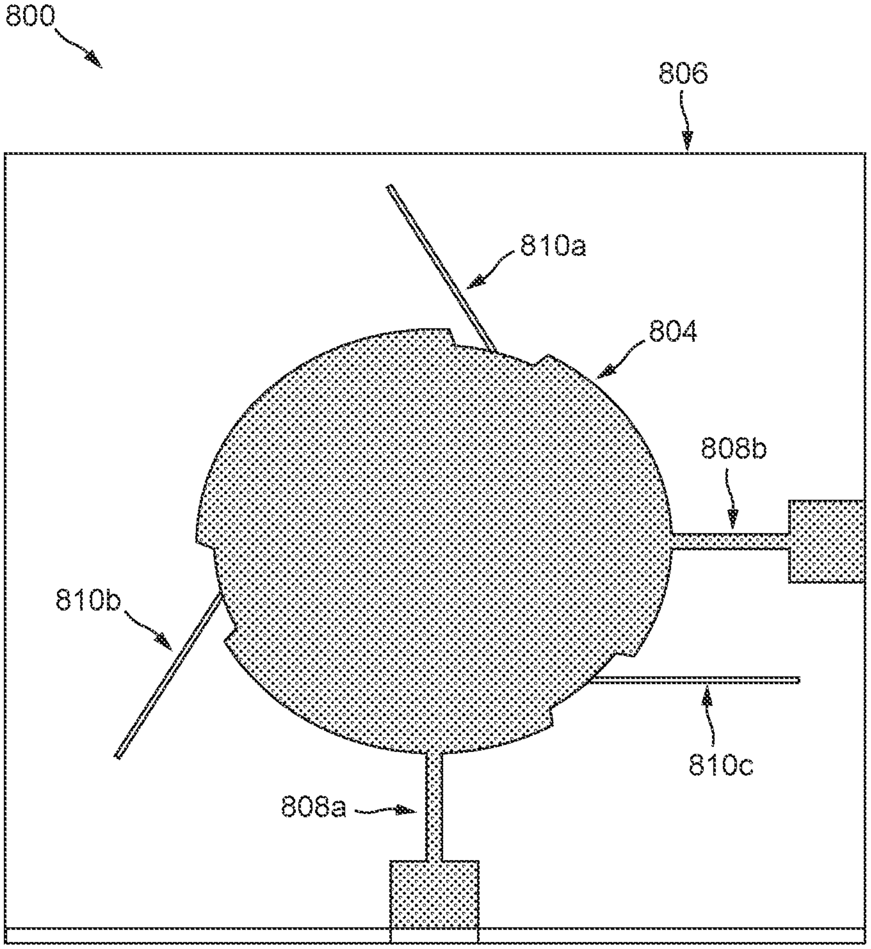
FIG. 8 is a schematic diagram illustrating a top view of an antenna, consistent with some embodiments of the present disclosure.

FIG. 8 is a schematic diagram illustrating a top view of an antenna 800, consistent with some embodiments of the present disclosure. Referring to FIG. 8, antenna 800 includes a substrate (not shown), a radiating element 804 disposed on a top surface of the substrate, a ground plane 806 formed on a bottom surface of the substrate. Radiating element 804 is a conductive layer having a mesh structure, such as radiating element 104 in FIG. 1A. In an embodiment, radiating element 804 has three recesses disposed on its circumference. The three recesses may be evenly spaced or distributed along the circumference, e.g., at 120 degrees. Antenna 800 includes three stubs 810_a_, 810_b_, and 810_c_, each of the stubs connected to a corresponding one of the recesses. The three stubs may be evenly spaced or distributed along the circumference, e.g., at 120 degrees. In an embodiment, each of the three stubs is tilted. Antenna 800 includes a feed line 808_a_ and a feed line 808_b_ connected to radiating element 804 to feed two frequency bands simultaneously. In an embodiment, 808_a_ and 808_b_ are similar to feed lines 108_a_ and 108_b_, except that feed lines 808_a_ and 808_b_ are substantially perpendicular to each other. Forming recesses on the radiating element and/or tilting the stubs allow for achievement of target frequency bands by promoting impedance matching and adjusting input impedance of the antenna.

Figure 9:
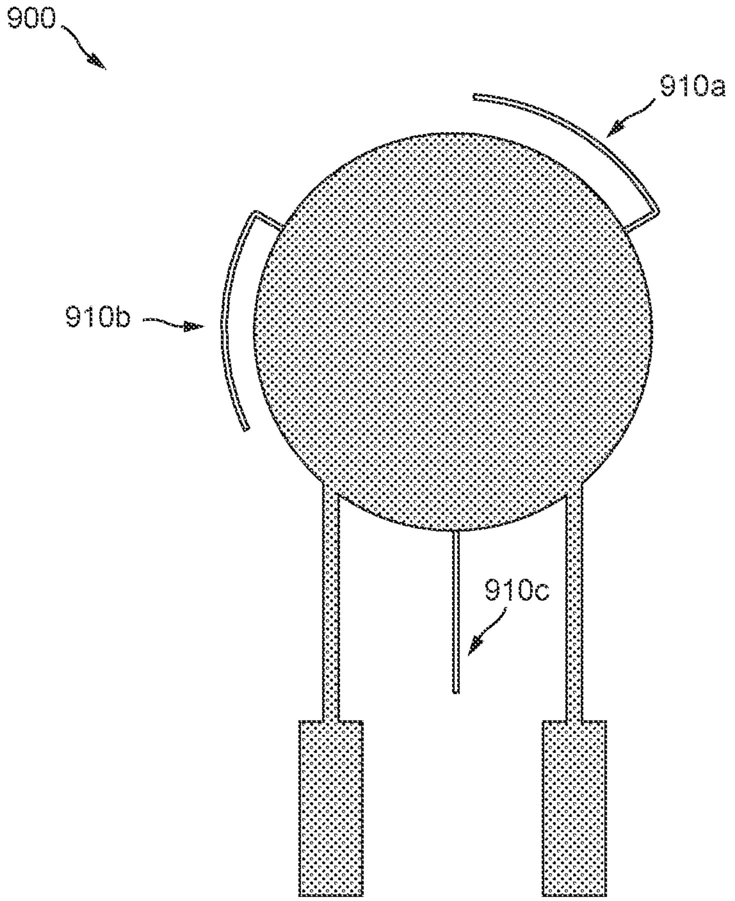
FIG. 9 is a schematic diagram illustrating a top view of an antenna, consistent with some embodiments of the present disclosure.

FIG. 9 is a schematic diagram illustrating a top view of an antenna 900, consistent with some embodiments of the present disclosure. Antenna 900 is similar to antenna 100 in FIG. 1A, except that antenna 900 includes stubs that are bent to a certain direction. For example, as shown in FIG. 9, antenna 900 includes three stubs 910*a*, 910*b*, and 910*c*. The three stubs may be evenly spaced or distributed along the circumference, e.g., at 120 degrees. Among the three stubs, stubs 910*a* and 910*b* are bent such that a portion of each of stubs 910*a* and 910*b* (the unbent portion) is perpendicular to the circumference of the radiating element of antenna 900, while a portion of each of stubs 910*a* and 910*b* (the bent portion) is parallel to the circumference of the radiating element of antenna 900. Stubs 910*a* and 910*b* may be bent to the same direction, for example, a counter-clockwise direction, as shown in FIG. 9. Alternatively, stubs 910*a* and 910*b* may be bent to a clockwise direction. As also shown in FIG. 9, stub 910*c* is not bent and extends radially from radiating element of the antenna. In an embodiment, only one of the three stubs may be bent.

Figure 10:
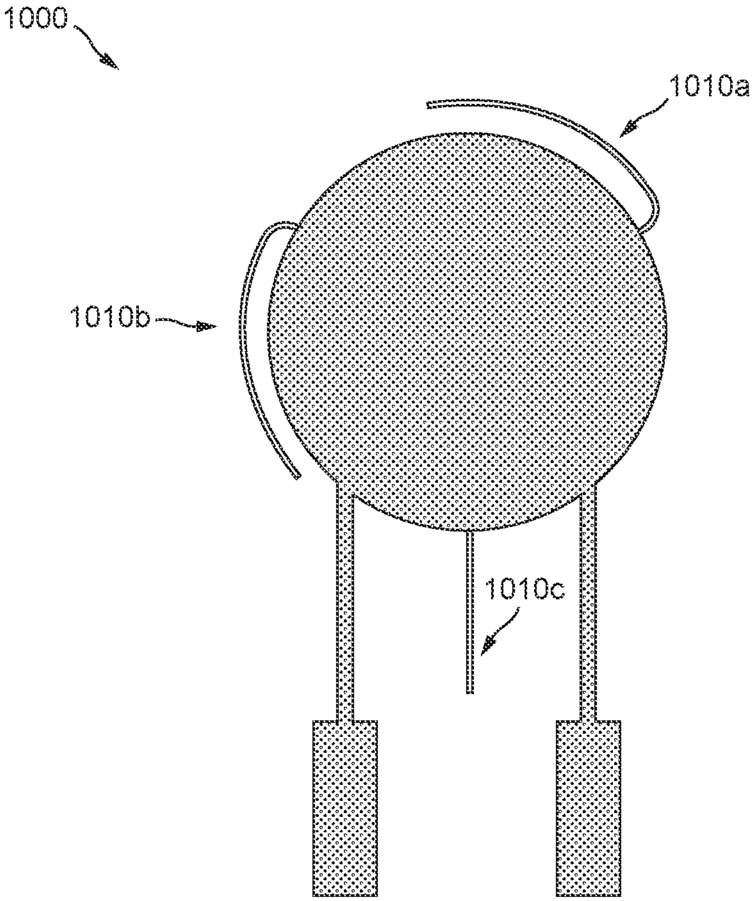
FIG. 10 is a schematic diagram illustrating a top view of an antenna, consistent with some embodiments of the present disclosure.

FIG. 10 is a schematic diagram illustrating a top view of an antenna 1000, consistent with some embodiments of the present disclosure. Antenna 1000 is similar to antenna 900 in FIG. 9, except that in antenna 1000, a bent portion and an unbent portion of a stub meet to form a curved portion. For example, as shown in FIG. 10, antenna 1000 includes three stubs 1010*a*, 1010*b*, and 1010*c*. The three stubs may be evenly spaced or distributed along the circumference, e.g., at 120 degrees. Among the three stubs, stubs 1010*a* and 1010*b* are bent such that a portion of each of stubs 1010*a* and 1010*b* (the bent portion) is parallel to the circumference of the radiating element of antenna 1000. The bending is smooth such that the bent portion and the unbent portion meet to form a curved portion. Stubs 1010*a* and 1010*b* may be bent to the same direction, for example, a counter-clockwise direction, as shown in FIG. 10. Alternatively, stubs 1010*a* and 1010*b* may be bent to a clockwise direction. As also shown in FIG. 10, stub 1010*c* is not bent and extends radially from radiating element of the antenna. In an embodiment, only one of the three stubs may be bent.

Figure 11:
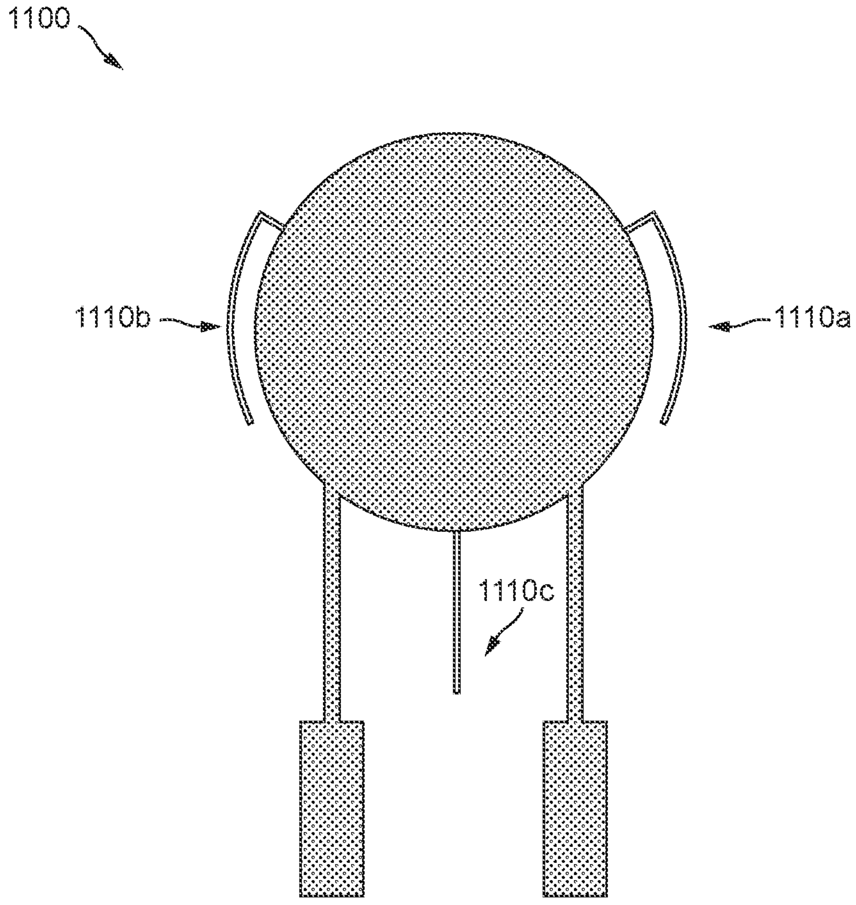
FIG. 11 is a schematic diagram illustrating a top view of an antenna, consistent with some embodiments of the present disclosure.

FIG. 11 is a schematic diagram illustrating a top view of an antenna 1100, consistent with some embodiments of the present disclosure. Antenna 1100 is similar to antenna 900 in FIG. 9, except that in antenna 1100, two stubs are bent to different directions. For example, as shown in FIG. 11, antenna 1100 includes three stubs 1110*a*, 1110*b*, and 1110*c*. The three stubs may be evenly spaced or distributed along the circumference, e.g., at 120 degrees. Among the three stubs, stub 1110*a* is bent to a clockwise direction while stub 1110*b* is bent to a counter-clockwise direction, as shown in FIG. 11. Alternatively, stub 1110*a* may be bent to a counter-clockwise direction while stub 1110*b* may be bent to a clockwise direction.

Figure 12:
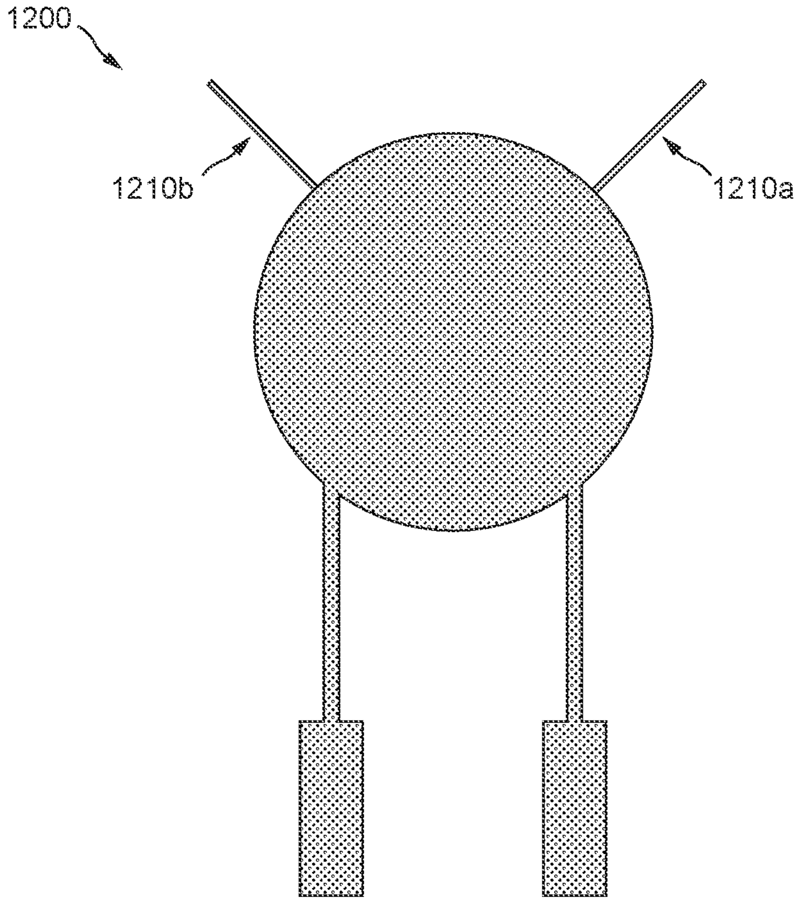
FIG. 12 is a schematic diagram illustrating a top view of an antenna, consistent with some embodiments of the present disclosure.

FIG. 12 is a schematic diagram illustrating a top view of an antenna 1200, consistent with some embodiments of the present disclosure. Antenna 1200 is similar to antenna 100 in FIG. 1A, except that antenna 1200 only has two stubs (1210*a* and 1210*b*), instead of three stubs as shown in FIG. 1A. As shown in FIG. 12, stubs 1210*a* and 1210*b* extend radially and are on the opposite side of the radiating element from the feed lines. Stubs 1210*a* and 1210*b* may be symmetrically positioned relative to the two feed lines and are spaced, e.g., 120 degrees apart.

Figure 13:
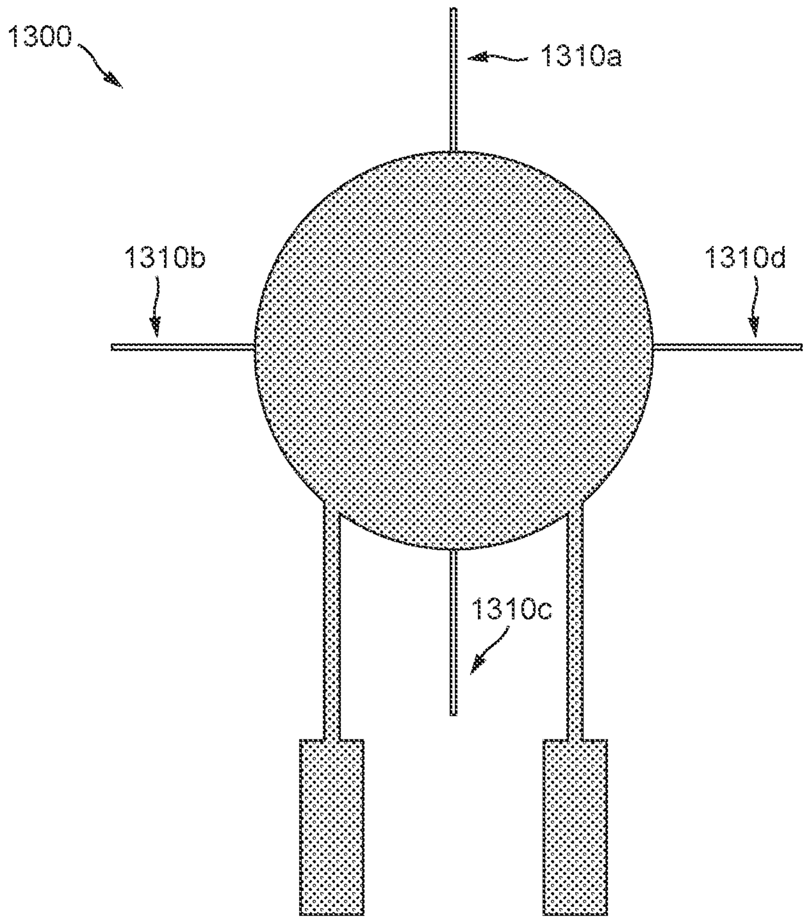
FIG. 13 is a schematic diagram illustrating a top view of an antenna, consistent with some embodiments of the present disclosure.

FIG. 13 is a schematic diagram illustrating a top view of an antenna 1300, consistent with some embodiments of the present disclosure. Antenna 1300 is similar to antenna 100 in FIG. 1A, except that antenna 1300 has four stubs (1310*a*, 1310*b*, 1310*c*, and 1310*d*), instead of three stubs as shown in FIG. 1A. The four stubs are evenly distributed, and are symmetrical with respect to the two feed lines, as shown in FIG. 13. Stubs 1310*a* and 1310*c* may be formed on a same line (a vertical line) and stubs 1310*b* and 1310*d* may be formed on a same line (a horizontal line). The four stubs extend radially, as shown in FIG. 13. Alternatively, the four stubs may be bend, similar to the bent stubs in FIGS. 9 and 10.

Figure 14:
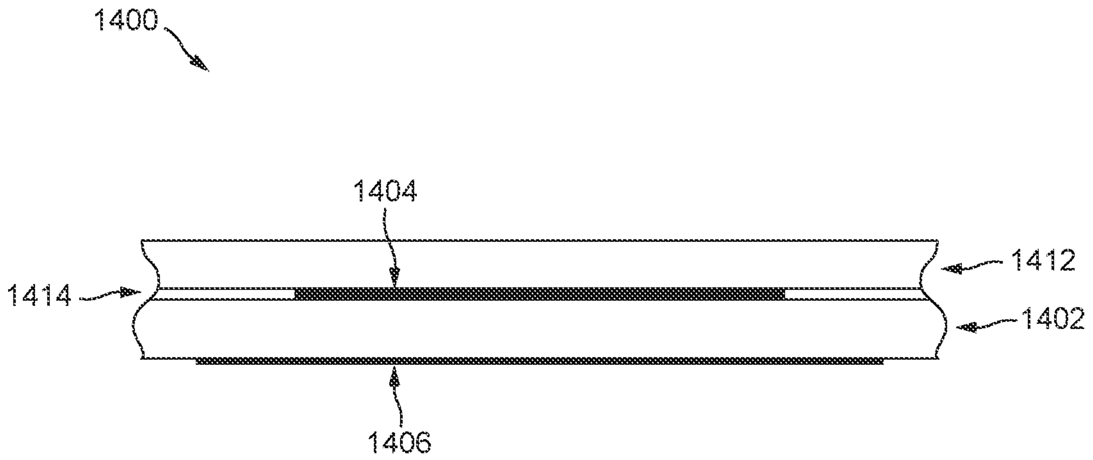
FIG. 14 is a schematic diagram illustrating a side view of an antenna, consistent with some embodiments of the present disclosure.

FIG. 14 is a schematic diagram illustrating a side view of an antenna 1400, consistent with some embodiments of the present disclosure. Referring to FIG. 14, antenna 1400 includes a transparent substrate 1402 (e.g., a glass layer), a radiating element 1404 disposed on a top surface of substrate 1402, and a ground plane 1406 formed on a bottom surface of substrate 1402. Antenna 1400 includes a second glass layer 1412 disposed on the top of radiating element 1404 such that radiating element 1404 is sandwiched in between substrate 1402 and glass layer 1412 to form a glass laminate structure. The empty space between substrate 1402 and glass layer 1412 can be filled with a transparent plastic element so that the plastic element surrounds radiating element 1404 to provide protection to the radiating element. Placing the radiating element inside the glass laminate and surrounding the radiating element with a transparent plastic element provides protection to the radiating element, leading to enhanced stability and robustness of the antenna.

Figure 15:
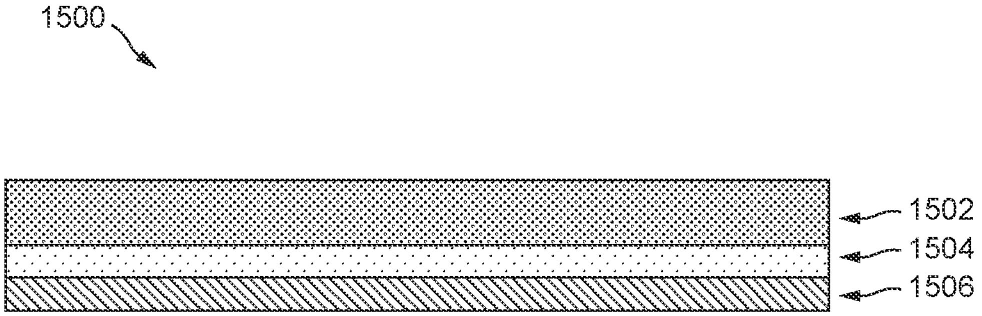
FIG. 15 is a schematic diagram illustrating an antenna sticker, consistent with some embodiments of the present disclosure.

FIG. 15 is a schematic diagram illustrating an antenna sticker 1500, consistent with some embodiments of the present disclosure. Referring to FIG. 15, antenna sticker 1500 includes a conductive mesh structure 1502, and an adhesive layer 1504 formed on a surface of the conductive mesh structure. Antenna sticker 1500 may include a protection layer 1506 to cover adhesive layer 1504 to enable handling before it is installed.

In an embodiment, antenna sticker 1500 is configured as a radiating element of an antenna, and conductive mesh structure 1502 includes a patch layer configured to receive a GNSS signal. Conductive mesh structure 1502 may also include at least two feed lines configured to connect the patch layer to an external circuit. In this embodiment, antenna sticker 1500 is configured to be adhered to an exterior surface of a glass roof or a glass window of a vehicle through adhesive layer 1504. Conductive mesh structure 1502 may also include a plurality of stubs connected to the patch layer of antenna sticker 1500.

In an embodiment, antenna sticker 1500 is configured as a ground plane of an antenna, and antenna sticker 1500 is configured to be adhered to an interior surface of a glass roof or a glass window of a vehicle through adhesive layer 1504. In this embodiment, conductive mesh structure 1502 functions as the ground plane of the antenna and may be aligned or at least partially overlapped with another antenna sticker, e.g., an antenna sticker made of antenna 1400 shown in FIG. 14, adhered to an exterior surface of a glass roof or a glass window, that functions as a radiating element of the antenna. In an embodiment, the alignment of the radiating element and the ground plane may be a rough alignment (e.g., millimeter or centimeter scale accuracy).

In some embodiments, a glass structure used as a roof or a window of a vehicle may be prepared by implementing the antennas described in this disclosure. In an embodiment, a first conductive mesh structure is formed on a first surface of the glass structure. The first conductive mesh structure includes a mesh-patterned patch layer configured to receive a GNSS signal. In an exemplary embodiment, the mesh pattern of the patch layer has a plurality of concentrically arranged openings to form a circular mesh-pattern. However, the mesh pattern is not so limited. Any pattern that provides multiple openings and suitable efficiency can be adopted.

The first conductive mesh structure includes at least two feed lines configured to connect the patch layer to an external circuit. The at least two feed lines may or may not have a mesh pattern. The at least two feed lines may be parallel or perpendicular to each other. Each of the at least two feed lines may include a first rectangular portion connected to the patch layer and a second rectangular portion connected to the external circuit, the first rectangular portion having a width smaller than a width of the second rectangular portion. The external circuit may be a receiver circuit or any other circuit that can condition and process the GNSS signal received by the antenna. The external circuit may include one or more hybrid couplers, one or more filters, one or more amplifiers, one or more cables, and a GNSS receiver. The external circuit may be mounted inside the vehicle.

The first conductive mesh structure may include two or more stubs connected to the patch layer. The two or more stubs may have a mesh pattern. Alternatively, the two or more stubs may not have a mesh pattern. In an embodiment, the patch layer is a circle and the two or more stubs are evenly distributed along the circumference of the circular patch. The two or more stubs may be straight or bent to a direction. The two or more stubs may be connected to recesses formed on the circumference of the circular patch.

In an embodiment, a second conductive mesh structure is formed on a second surface of the glass structure. The second surface is opposite to the first surface of the glass structure. The second conductive mesh structure may have a mesh pattern that is the same as or different from the mesh pattern of the patch layer. The second conductive mesh structure functions as a ground plane of the antenna and may be aligned or at least partially overlapped with the first conductive mesh structure to form the antenna. In an embodiment, the alignment of the first and second conductive mesh structures may be a rough alignment (e.g., millimeter or centimeter scale accuracy).

In an embodiment, the first and second conductive mesh structures are formed during manufacturing of the glass structure for the vehicle. For example, the first and second conductive mesh structures may be formed by deposition of metal layers on the first and second surfaces followed by photolithography and etching processes. However, the method of forming the conductive mesh structures is not so limited. Any currently available or future developed methods for forming a mesh structure on glass can be used.

In an embodiment, the antennas described above may be designed for use at frequencies other than the L1/L5 frequency bands. For example, the L1/L2 frequency bands or any other different combinations of frequencies may be used. In an embodiment, antenna 100 may capture L1/L2C bands of global positioning system (GPS) or E1/E5b bands of Galileo (European Union's satellite system) or B1C/B2b bands of BeiDou (Chinese satellite system). The antennas may also track the L1OF/L2OF bands of GLONASS (Russian satellite system) at low carrier-to-noise density ratios of signals ($CN_0$).

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. An antenna sticker, comprising:

a conductive mesh structure having a first surface and a second surface;

an adhesive layer formed on the second surface of the conductive mesh structure, the adhesive layer being in direct contact with the conductive mesh structure; and a protective layer covering the adhesive layer for handling of the antenna sticker before installation, wherein the antenna sticker is configured as a radiating element of an antenna having a circular shape, and at least two stubs are connected to a circumference of the radiating element, each of the at least two stubs being tilted and connected to a corresponding one of at least two recesses on the circumference of the radiating element.

2. The antenna sticker of claim 1, wherein the conductive mesh structure comprises a patch layer configured to receive a Global Navigation Satellite System (GNSS) signal, the antenna sticker being configured to be adhered to an exterior surface of a glass roof or a glass window of a vehicle through the adhesive layer.

3. The antenna sticker of claim 2, wherein the conductive mesh structure further comprises at least two feed lines configured to connect the patch layer to an external circuit.

4. The antenna sticker of claim 1, wherein the antenna sticker is configured to be adhered to an exterior surface of a glass roof or a glass window of a vehicle through the adhesive layer.

* * * * *